United States Patent [19]

Clark

[11] 4,064,828
[45] Dec. 27, 1977

[54] FREEZE/THAW INDICATOR

[76] Inventor: Trevor Percival Clark, 3650 Sunnycrest Drive, North Vancouver, B. C., Canada

[21] Appl. No.: 740,046

[22] Filed: Nov. 8, 1976

[30] Foreign Application Priority Data

Nov. 11, 1975 United Kingdom ............... 46464/75

[51] Int. Cl.$^2$ .................. G01D 21/00; F25B 49/00
[52] U.S. Cl. .................................. 116/114.5; 62/125; 252/408
[58] Field of Search ............... 116/114.5, 106, 114 V; 73/358, 353; 62/125, 127, 129; 252/408 R

[56] References Cited

U.S. PATENT DOCUMENTS

| 2,350,637 | 6/1944 | Pittman | 116/114.5 |
| 2,788,282 | 4/1957 | Hammond, Jr. | 116/114.5 |
| 3,063,235 | 11/1962 | Winchell | 62/125 X |
| 3,518,961 | 7/1970 | Kovac | 73/358 X |
| 3,520,189 | 7/1970 | Mann | 73/353 X |

Primary Examiner—Daniel M. Yasich

[57] ABSTRACT

A freeze-thaw indicator for evidencing thawing of frozen foods in freezer compartments which has a float disposed in the container containing an aqueous solution of urea. The float is frozen in place in an immersed condition in the urea and rises only when the aqueous solution has been subjected to thawing temperatures over a time sufficient to completely liquify the aqueous solution. The strength of the aqueous solution is adjusted so that it will not liquify during the freeze thaws cycles of frost-free-type of refrigerators.

2 Claims, 5 Drawing Figures

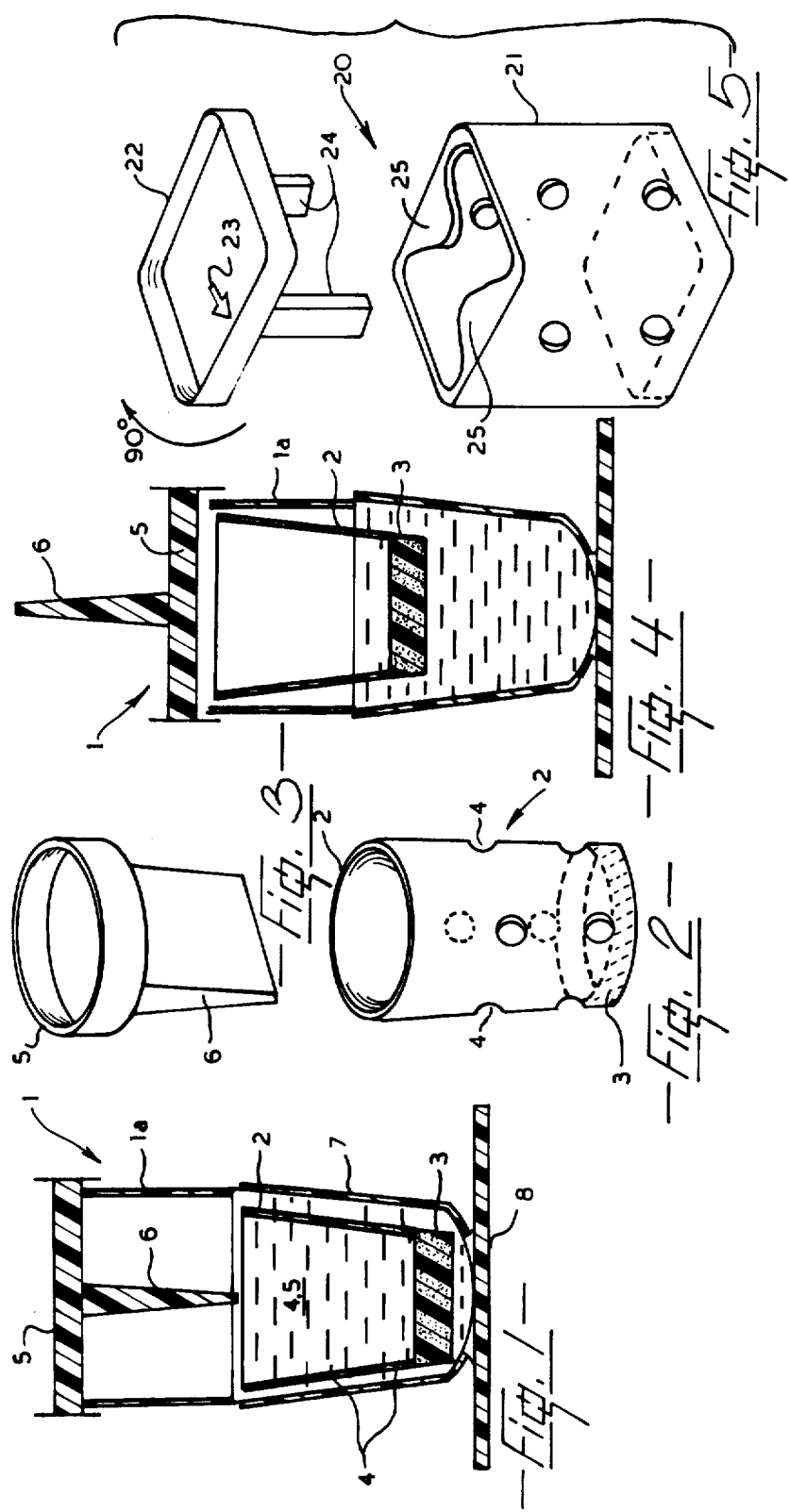

FREEZE/THAW INDICATOR

BACKGROUND OF THE INVENTION

1. Field of the Invention

This invention relates to indicators for evidencing when frozen foods in freezer compartments have been subject to temperatures above a previously selected temperature for a sufficient time to result in deterioration of the food and relates, in particular, to indicators for use in frost-free-type refrigerators and freezers having heating devices which periodically heat the walls of the freezer compartment for a length of time sufficient to remove ice and frost from the walls.

2. Prior Art

The preservation of food during storage has long been accomplished by means of refrigeration which keeps the food in a frozen condition so that degradation by enzymes and bacteria is prevented. Those experienced in the science of refrigeration have found that frozen food must be maintained near 0° F. and should not rise above 5° F. for any extended period of storage or enzymatic or bacterial action or both can take place with the result that changes in taste and the development of toxic substances can occur. In many cases, power failure or improper operation of equipment have resulted in the temperature rising above 5° F. for extended periods or even complete thawing has taken place. Subsequent resumption of power re-freezes the food and in many cases the thawing cycle escapes detection. It is, therefore, not known that the food may be in a dangerous condition for human consumption.

A number of devices have been invented to detect whether a thawing and subsequent freezing cycle have taken place. Most of these devices have made use of irreversible damage caused to emulsions, gels, frangible partitions, capsules, or of the deformation of cast geometrical shapes of ice. These types of inventions, being irreversible, can only be used once. Consequently, every time the refrigerator is defrosted, they must be replaced. They will also suffer permanent damage if subjected to freezing during storage or shipment. A lesser number of devices have been invented which are re-usable and in some cases would operate as described in conventional refrigerators. However, most modern refrigerators are of the frost-free-type which operate on the principle that, twice a day, they pass through a heating cycle to remove accumulated surface frost. During the course of this defrosting cycle the temperature in the refrigeration compartment rises between 40° and 45° F. and the elapsed time for the equipment to change from 0° up to over 40° F. and back down again to 0° F. takes about 1½ hours.

None of the pre-described devices which claim to be usable in temperature ranges of less than 0° up to 32° F., are usable in frost-free refrigerators unless they are replaced or re-set twice a day, as they are activated during each frost-free heat cycle. Consequently, it would be impossible, under normal usage of the refrigerator, to determine whether such inventions had been set off by improper operation of the equipment or whether they had been caused to function during the heating cycle. It is, therefore, the object of the present invention to provide a means of determining whether frost-free refrigeration equipment will maintain a pre-selected temperature between 0° and 32° F. during the periods between the frost-free heating cycles. The present device is not activated during the heating cycle and is re-usable so that it may be re-used in case of shut-down for repairs or if changing refrigerators. The present invention is based on both a unique engineering concept and a very unique harmless chemical solution which provides for successful operation under exposure to the heat cycle in frost-free equipment.

Super-cooling of liquids in freeze/thaw detectors is a major problem as the well known methods of starting crystallization, such as stirring, shaking, seeding, etc., are not practical in such devices and even the addition of substances, such as silver iodide can be ineffective. Glycols, alcohols (eg. benzyl alcohol), o-dichlorobenzene for example, can be kept for weeks at temperatures lower than their published freezing points without solidifying. Tests have indicated that aqueous solutions of glycols, sucrose, sorbitol, mannitol, alcohol, glycerol, sodium chloride, calcium chloride, magnesium chloride, acetic acid, and ammonium chloride formed slushes when frozen and were difficult, even with extensive freezing, to form a homogeneous solid which did not have a portion of liquid liquor within its mass. A solution of ammonia in water was found to freeze sharply and solidly, but it was found that it, along with all the above chemicals and solutions, melted readily when subjected to even one heat cycle of frost-free refrigerator. It was also found, that when such solutions were adjusted to freeze between 0° and 26° F., that the solutions that had the lower freezing points were much quicker to melt during the frost-free cycle. Samples of vegetable oils and fats were selected which froze sharply between temperatures of 0° and 14° F. but were found to melt more readily in the frost-free heat cycle than many of the chemicals tested. Aqueous glycol solutions and vegetable oils were placed in separate vials so that the vials were half-filled. These vials were half imbedded in 2½ inch cubes of foamed urethane insulation and frozen. When these insulated samples were exposed to the heat cycle of a frost-free refrigerator, all samples were readily melted.

SUMMARY OF THE INVENTION

The present invention provides an indicator which uses the liquid which can be frozen completely solid at 12.5° F. and will not melt when a pre-determined quantity is subject to repeated exposure to heat cycles of the conventional frost-free refrigerator.

The indicator of the present invention comprises a float which is immersed and frozen in place in a liquid and which only rises when the liquid thaws after being subject to temperatures in excessive of a pre-determined time.

A detailed description following, related to the drawings, gives exemplification of apparatus according to the invention which, however, is capable or expression in means other than those particularly described and illustrated.

DESCRIPTION OF THE DRAWINGS

FIG. 1 is a cross-sectional view of one embodiment of the invention shown in an activating position, FIG. 2 is a perspective view of a cylindrical design of float, also shown in FIG. 1, FIG. 3 is one form of cap and float depressor, also shown in FIG. 1, FIG. 4 is another cross-sectional view of the device shown in FIG. 1, FIG. 5 is a perspective view of another embodiment of the indicator.

DETAILED DESCRIPTION

Referring to FIG. 1, which shows one embodiment, 1 the invention has a cylindrical container 1a with an open top end and an exaggerated taper on the lower half. This container is preferrably made of a transparent flexible plastic, such as polypropylene, but may be made of any other suitable transparent material such as glass. The numerical reference 2 (also shown in FIG. 2), designates a cylndrical float 2 which fits loosely in the container 1a. This float 2 is of thin-walled construction and has a bouyancy component 3 consisting of preferrably a light-weight foamed plastic disc. The walls of the component float have holes 4 located just above the buoyant disc 3 and also about half-way up the walls of the float cylinder. This float is composed preferrably of a lightweight plastic material such as polyethylene and is colored preferrably bright red, although some other color may be used. The buoyancy of the float is so designed that the upper edge of the float will rise to the top of the outer container when the float is immersed in a liquid 4.5 used in the device. This liquid (subsequently described) is used to fill the outer container in such a manner that when the float is depressed to the bottom of the container 1a (as shown in FIG. 1) the liquid is slightly above the upper lip of the cylindrical float. A Cap 5, with an attached depressor vane 6, can be snapped on the top of the container 1a in two positions (as shown in FIGS. 1 and 4). In FIG. 1 it is shown holding down the float and in FIG. 4 it is shown projecting upwards, outside of the container. This cap is composed preferrably of polyethlene but any other noncorrosive suitable material may be used. An outer mask 7 covers the lower half of the container so that the liquid and depressed float are hidden from view. The upper edges of this mask are arranged to extend slightly above the edges of the liquid. The mask may consist of any convenient material, such as paint, foil or a label. A base 8 is attached to the lower end of the outer container to provide stability for standing the container in an upright position.

The liquid which is an aqueous solution of urea in the proportion by weight of not less than 1 part urea and 2 parts water freezes sharply at 12.5° F. without any problems encountered with super-cooling.

A solution of urea, prepared by dissolving 50 grams of urea in 100 grams of water, will freeze sharply at 12.5° F. without any problems being encountered with super-cooling. It was found that increasing the amount of urea to 60 grams, or more, to 100 grams of water did not lower the freezing point any further. These stronger solutions still freeze sharply at 12.5° F. Such solutions of urea freeze completely solid at 12.5° F. and will not melt when a 25 ml. sample is subjected to repeated exposures to the heat cycles of frost-free refrigerators. Such solutions are also:

1. odourless
2. non-toxic
3. of sharply defined melting point
4. free from super-cooling effects
5. stable during storage
6. economical and easy to manufacture
7. of high specific heat
8. of high heat of fusion when in the frozen state
9. will not melt when subjected to the heating/defrosting cycles of a frost-free refrigerator, and yet, must melt if the temperature between heating cycles is sustained at an unsafe temperature (for example above 5° F.)

Small amounts of magnesium chloride can be added to the pre-described urea solutions so that the freezing point can be adjusted to a preferred 6° F. and that such frozen solution, tested with 25 ml. volumes, will not liquify when subjected to continuous exposure to successive frost-free heat cycles. The adjustment for freezing point is not limited to 6° F. but can be set between 0° and 32° F. 6° F. is preferred as it is slightly above the 5° F. required for safe food storage. The magnesium chloride can be added to solutions if the freezing point is desired to be lower than 12.5° F. Three examples of suitable solutions are as follows:

EXAMPLE 1

60 Grams of urea are dissolved in 100 ml. of water. This solution solidifies at 12.5° F.

EXAMPLE 2

10 Grams of magnesium chloride ($MgCl_2 \, 6H_2O$) and 60 grams of urea are dissolved in 100 ml. of water. This solidifies sharply at $+10°$ F.

EXAMPLE 3

14 Grams of magnesium chloride ($MgCL_2 \, 6H_2O$) and 60 grams of urea are dissolved in 100 ml. of water. This solution solidifies sharply at $+6°$ F.

It is also preferrable to add a suitable non-toxic odourless, taint-free pesevvative such as (alkyl trimethylammonium bromide), which is effective in amounts of 0.15 percent to 0.3 percent of the total weight of the solution.

The urea solution described behaves as follows when subjected to temperatures near the desired 0° to 5° F.

The pure urea solution (Example 1) shows a slight separation of crystals of urea, due to reduced solubility, at 23° F. These crystal seed the solution and prevent super-cooling when the solution reaches its freezing point of 12.5° F. Large masses of interlocking crystals of urea are thrown out of solution, due to reduced solubility as the temperature is reduced to the freezing point of the remaining solution. This mass of urea crystals and frozen urea solution become firmly locked into place, within and around the float, rendering the float immobile. The specific heat and heat of fusion of the mass remains high. When the temperature in the freezing compartment rises to over 40° F. during the heat cycle of defrosting, this frozen mass does not melt. Although urea is very soluble, its rate of solution is slow, particularly at lower temperatures. Urea crystals absorb large quantities of heat when dissolving in water (they are endothermic). Consequently, as the temperature is rapidly rising in the freezing compartment during de-frosting, the precipitated urea crystals cause the mixture to be "self-cooling" and prevents a rapid rise in temperature within the frozen mass. Consequently, the float 2 is prevented from rising within the container as it can not lift the solid mass above the surface. However, if the temperatures within the freezer compartment does not return to a sustained 12.5° F. (using Example 1 urea solution) shortly after de-frosing has occurred the frozen mass of urea will melt and the float will rise into view, indicating a malfunction. In similar fashion, for example, the urea-magnesium chloride solution (Example 3) will indicate whether the freezer temperature has not been maintained at 6° F. or lower between de-frosting cycles.

It is preferred that the volume of solution used in the present invention should be approximately 25 ml. to 30 ml. but is not intended to be restricted to such volumes.

The present invention is used in the following manner. Referring to FIG. 1, cap 5 with attached depressor vane 6 is snapped onto the top of the outer container 1 with the depressor vane resting on the upper edges of the float 2, holding the float beneath the solution as shown in FIG. 1. The device is then placed in a vertical position in the freezer compartment and cooled until the enclosed liquid has solidified. Solidification is obvious as the liquid becomes opaque white in color, hiding the float from view even when viewed from an upper angle through the clear upper walls of the cylinder. The liquid freezes solid in about three hours at 0° F. At this time the float is firmly locked in the submerged position by an interlocking mass of crystals and frozen solution. The cap is then removed, inverted and replaced with the depressor vane 6 extended upward outside the container as shown in FIG. 4. The device is then ready to indicate any undesirable rise in temperature above the pre-selected range between 0° and 32° F., other than the designed rise in temperature the de-frosting cycles.

In the event of malfunction of the equipment or of power failure, when the temperature rises above the desired level (preferrably +5° F.) during the period between the defrosting cycles, the solution will melt and the colored float will rise, exposing itself to view through the transparent upper portion of the device, indicating that the stored food has been subjected to unsafe storage conditions. If power resumes and re-freezing occurs, the brightly colored exposed float remains in its elevated position indicating that a thawing and re-freezing cycle has occured. If a partial condition of thawing occurs between the period of de-frosting cycles, the float will only rise part of the way, as its movement upward is retarded by masses of crystals and partly frozen liquid, both of which are trapped inside the float, and the buoyant force on the float is insufficient to lift the partially melted mass above the surface of the melted portion of the liquid. Consequently, this device can give a quantitative evaluation of the degree of thawing that has taken place. The mask 7 completely hides the color of the float, if by chance, the float touches the walls of the container while being frozen.

FIG. 5 shows another embodiment 20 which has a float 21 and cap 22. A matching outer square container corresponding to container 1a is not shown. The cap 22 in this case is not required to be inverted during use. An indicator mark 23 located on the cap 22 is rotated 90° to change the position of depressor legs 24 which are used in similar fashion to the depressor vane, described in FIG. 3. These depressor legs, in the position illustrated, impinge on lugs 25 holding the float submerged while the solution is being frozen. Once frozen, the cap 22 is rotated 90° so that the legs will clear the lugs on the float, allowing the float to rise.

I claim:

1. A freeze-thaw indicator for evidencing when temperatures in a freezer compartment rise above a predetermined value comprising:
    a. a container having transparent side walls adapted to be placed within the freezer compartments in an upright position,
    b. a liquid having pre-determined freezing and thawing temperatures and being formed as an aqueous solution of urea and magnesium chloride containing by weight 0.1 to 0.24 parts magnesium chloride, not less than one part urea and two parts water,
    retaining means selectively allowing a float to be immersed in said liquid and retained in a selected position towards the bottom of the container until frozen in the liquid, whereby said float will rise and float in the liquid when the liquid reaches liquid state so as to evidence when ambient temperatures within the compartment have risen above the thawing temperatures of the liquid.

2. An indicator as claimed in claim 1 said retaining means including a reversible cap securable in two positions securedly fitted to the top of the container and having a depressor foot adapted in one position of the cap for depressing the float to an immersed condition in the liquid temporarily until the liquid has frozen.

* * * * *